United States Patent
Lakhani

[19]

[11] Patent Number: 6,078,212
[45] Date of Patent: *Jun. 20, 2000

[54] VT CANCELLATION IN OUTPUT STAGE OF CHARGE PUMP

[75] Inventor: Vinod Lakhani, Milpitas, Calif.

[73] Assignee: Micron Technology, Inc., Boise, Id.

[*] Notice: This patent issued on a continued prosecution application filed under 37 CFR 1.53(d), and is subject to the twenty year patent term provisions of 35 U.S.C. 154(a)(2).

[21] Appl. No.: 08/914,072

[22] Filed: Aug. 18, 1997

[51] Int. Cl.⁷ .................................................. G05F 3/02
[52] U.S. Cl. ................................. 327/536; 327/537
[58] Field of Search ........................... 327/536, 537; 307/110

[56] References Cited

U.S. PATENT DOCUMENTS

| | | | |
|---|---|---|---|
| 5,029,063 | 7/1991 | Lingstaedt et al. | 363/60 |
| 5,335,200 | 8/1994 | Coffman et al. | 365/218 |
| 5,422,586 | 6/1995 | Tedrow et al. | 327/306 |
| 5,489,870 | 2/1996 | Arakawa | 327/536 |
| 5,521,547 | 5/1996 | Tsukada | 327/537 |
| 5,589,793 | 12/1996 | Kassapian | 327/536 |

*Primary Examiner*—Terry D. Cunningham
*Attorney, Agent, or Firm*—Schwegman, Lundberg, Woessner & Kluth, P.A.

[57] ABSTRACT

A charge pump employs N pump stages to transform an input supply voltage to a pump output voltage, such as a programming voltage used in a non-volatile memory. Each pump stage receives a stage input voltage and provides a stage output voltage. A first pump stage receives the input supply voltage as its stage input voltage. An output transistor is configured as an output diode coupled between the Nth stage output voltage and the pump output voltage. The output transistor has a threshold voltage which produces a voltage drop across the output diode. An output threshold voltage canceler compensates for the threshold voltage of the output transistor.

15 Claims, 12 Drawing Sheets

VT CANCELLATION IN OUTPUT STAGE OF CHARGE PUMP

THE FIELD OF THE INVENTION

The present invention relates generally to integrated circuits, and more particularly to charge pumps employed in integrated circuits to transfer a supply voltage to a higher voltage needed to operate a circuit element, such as a programming voltage in non-volatile memories.

BACKGROUND OF THE INVENTION

Voltage multipliers increase an input supply voltage in order to provide a higher output voltage required to operate circuit elements in integrated circuits. A charge pump is one type of voltage multiplier typically employed in non-volatile memory systems, such as flash memory systems, to provide voltages required for programming and erasing memory cells in a non-volatile memory. A charge pump typically includes several pump stages which each include a pump capacitor which is charged and discharged during a clock cycle of the charge pump. A stage diode is coupled between the pump capacitor and the stage input voltage to prevent discharging of the pump capacitor prior to the pump capacitor having additional charge placed on it. Thus, a charge pump progressively stores more charge on the capacitor component of each stage, and several such stages being placed together in the charge pump produce an increasing voltage level. In integrated circuits, the diode and the capacitor are typically formed from properly configured transistors.

One or more clock signals typically trigger the charging of the pump capacitors. A typical clock signal has a clock frequency with a time period somewhat less than the discharge time of the pump capacitors. In one such design, two clock signals having opposite phase trigger the charging of alternate stages of a multi-stage charge pump. The opposite phase clock signals in this design permit increasing the amount of charge which can be placed on the pump capacitors.

A conventional pump circuit 20 is illustrated generally in schematic diagram form in FIG. 1A. Pump circuit 20 receives an input supply voltage on a line 22. A first clock signal Ph1 is received on a line 24 and a second clock signal Ph2 having the opposite phase of clock signal Ph1 is received on a line 26. FIG. 1B illustrates typical square wave clock signals Ph1 and Ph2 in timing diagram form. As illustrated in FIG. 1B, clock signals Ph1 and Ph2 have opposite phases and amplitudes corresponding to the amplitude to the input supply voltage on line 22. The input supply voltage on line 22 provides the initial supply of charge for pump circuit 20.

Pump circuit 20 includes N pump stages, as represented by a first pump stage 28 and a second pump stage 30. Clock signal Ph1 is coupled to the first pump stage 28 and clock signal Ph2 is coupled to the second pump stage 30. Similarly, clock signals Ph1 and Ph2 are alternately coupled to the remaining N−2 pump stages of pump circuit 20. Each of the N pump stages comprise a stage transistor figured to function as a diode, such as indicated at 32a for first pump stage 28 and at 32b for second pump stage 30. Each pump stage also includes a pump capacitor, such as indicated at 34a for pump stage 28 and at 34b for pump stage 30. A stray capacitance ($C_s$), indicated at 36a for pump stage 28 and at 36b for pump stage 30, represents a parasitic capacitance between the substrate of the integrated circuit containing pump circuit 20 and the stage output node for the stage (i.e., the charged node for that pump stage), such as output node VS1 for pump stage 28 and output node VS2 for pump stage 30. Stage transistors 32a and 32b are typically configured to act as diodes by connecting the gate of the transistor to its drain. Pump capacitor 34a is coupled between clock signal Ph1 and the first stage output node VS1 and pump capacitor 34b is coupled between clock signal Ph2 and the second stage output node VS2.

The N pump stages are connected in a serial manner to eventually produce an Nth stage output voltage on a line 40. The Nth stage output voltage is provide to an output transistor 42. Output transistor 42 is configured to act as a diode by connecting its gate to its drain and provides a pump output voltage on a line 44. Output transistor 42 shields the Nth stage output voltage on line 40 from a load (not shown) of the pump circuit 20.

Pump capacitors 34a and 34b are typically implemented in the form of a properly configured transistor, which produces an additional stray capacitance associated with the configured transistor, associated routing, and adjacent devices. This stray capacitance is on the driver side of pump capacitor 34a and 34b. As noted above, there is also a stray capacitance on the pumped node side, which is labeled as 36a and 36b in FIG. 1A. As to the clock driver side stray capacitance (not shown), this capacitance must be charged and discharged with each cycling of the stages of the charge pump, thereby increasing the power required to operate the pump.

The efficiency of pump circuit 20 is defined as the ratio of the output power to input power of the pump circuit, and is represented by the following Equation I:

$$\text{Efficiency} = \frac{V_{out} \cdot I_{load}}{V_{supply} \cdot I_{supply}} \qquad \text{Equation I}$$

$$V_{out} = V_{supply} + N \cdot [C/(C+C_s) \cdot V_{supply} - VTN] - VTN - V_{dl}$$

where, $V_{supply}$=Input supply voltage to the pump circuit;
N=number of charge pump stages;
VTN=voltage drop across the diode in a pump stage;
$V_{dl}$=voltage drop due to the load current (depends upon N, clock frequency, load current, diode resistance, and pump stage capacitance);
C=pump capacitance per stage; and
$C^s$=stray capacitance per stage on the pumped node side.

As represented in Equation I, the efficiency of pump circuit 20 can be increased by increasing $V_{out}$ or by decreasing $I_{supply}$ for a given number of stages. In one previous design, $V_{out}$ is increased by employing threshold cancellation techniques and/or by employing transistors configured as diodes with lower threshold voltages for the pump stage diodes. A disadvantage of employing lower threshold voltage transistors is that these transistors require additional manufacturing steps. $V_{out}$ can also be increased by reducing $C_s$, which can be accomplished by optimizing the physical implementation of the charge pump.

Another conventional pump circuit is generally illustrated at 50 in FIG. 2A in schematic diagram form. Pump circuit 50 employs a technique of threshold voltage (VT) cancellation to increase the pump output voltage and thereby the efficiency of a charge pump. The VT of a transistor configured to act as a diode corresponds to the VTN voltage drop term of Equation I.

As illustrated in FIG. 2A, pump circuit 50 receives an input supply voltage on a line 52. Pump circuit 50 receives four clock signals (Ph1 on a line 54, Ph2 on a line 56, Ph1a on a line 58, and Ph2a on a line 60) to control the operation of pump circuit 50. Clock signals Ph1, Ph1a, Ph2 and Ph2a are illustrated in timing diagram form in FIG. 2B. As illustrated in FIG. 2B, clock signals Ph1 and Ph2 are typically square waves having opposite phase, while clock signals Ph1a and Ph2a are square waves that have smaller duty cycles than clock signals of Ph1 and Ph2, such that clock Ph1a and Ph2a have a shorter time at active high values than the time clock signals Ph1 and Ph2 are at active high values.

A first pump stage 62 comprises a stage transistor 66a and a second pump stage 64 comprises a stage transistor 66b where transistors 66a–b are configured to act as diodes. Pump stage 62 includes a pump capacitor 68a coupled between clock signal Ph1 and an output node VS1 of first pump stage 62. Similarly, pump stage 64 includes a pump capacitor 68b coupled between clock signal Ph2 and an output node VS2 of pump stage 64. A capacitance indicated at 70a and 70b represents the stray capacitance ($C_s$) on the charged node side of pump stages 62 and 64 respectively. In addition, a capacitance labeled 72a and 72b represents the stray capacitance ($C_c$) of pump capacitors 68a and 68b respectively on the clock side of the pump circuit which arises when pump capacitors 68a–b are implemented in the form of properly configured transistors or other such fabricated capacitors.

Pump stages 62 and 64 also include VT canceler circuits 74a and 74b respectively. VT canceler circuit 74a includes a canceler capacitor 76a coupled between the Ph2a clock signal on line 60 and a VG1 node at the gate of stage transistor 66a. VT canceler circuit 74a also includes a switching N-channel transistor 78a having its source coupled to the input supply voltage on line 52, its drain coupled to node VG1, and its gate coupled to the stage output node VS1, such that when switching transistor 78a is switched on stage transistor 66a becomes configured to act as a diode connected between the input supply voltage on line 52 and the stage output voltage on node VS1. Similarly, VT canceler 74b includes a canceler capacitor 76b coupled between clock signal Ph1a on line 58 and a node VG2 at the gate of stage transistor 66b. VT canceler 74b also includes a switching N-channel transistor 78b having its source coupled to the input of pump stage 64 at node VS1, its drain coupled to node VG2, and its gate coupled to the stage output node VS2.

An output transistor 80 is configured as a diode by coupling its gate to its drain, and provides a pump output voltage on an output line 82. Output transistor 80 is coupled between stage output node VS2 and the pump output voltage on output line 82. Output transistor 80 shields the final pumped voltage at node VS2 from the load or output capacitance connected to output line 82.

The VT cancellation operation of pump circuit 50 is better understood by referring to the clock timing diagram of FIG. 2B along with the schematic diagram FIG. 2A. At time T1, clock signal Ph1 goes active high to cause pump capacitor 68a to be charged. As a result, node VS1 is pumped by an amount of voltage which is based on the ratio of the capacitances of capacitors 68a and 70a. The increased voltage on VS1 is fed to the gate of switching transistor 78a which turns on transistor 78a, to thereby effectively connect the input supply voltage on line 52 to node VG1. Prior to time T2, clock signal Ph1 goes inactive low, and at time T2, clock signal Ph2a goes active high to cause canceler capacitor 76a to charge which pumps the voltage at node VG1. Consequently, the voltage at node VG1 is pumped above the input supply voltage level on line 52.

The VG1 node voltage at the gate of stage transistor 66a being above the level of the input supply voltage at the drain of stage transistor 66a turns on stage transistor 66a to permit charging of node VS1 to the input supply voltage level on line 52. Therefore, VT canceler circuit 74a compensates for the VT drop across transistor 66a. Without VT canceler circuit 74a, the threshold voltage drop would cause the voltage at node VS1 to be equal to the input supply voltage minus VT (where VT is the threshold voltage drop of stage transistor 66a). With VT canceler circuit 74a, the voltage available at node VS1 is increased substantially to the input supply voltage, which can then be used as a base line voltage for the next pump stage 64.

At time T3, the voltage level of node VS1 is at the input supply voltage level on line 52. On the rising edge of clock signal Ph1, starting at time T3, node VS1 is pumped up from the input supply voltage level. Clock signals Ph2 and Ph1a are then employed to control pump circuit 50 to increase the voltage at node VS2 with second pump stage 64. Second pump stage 64 operates similar to first pump stage 62 as described above, except that, instead of pre-charging VS2 to a level corresponding to the input voltage supply, node VG2 is pre-charged to a level equal to that of the voltage at node VS1. Clock signal Ph2 is employed to charge capacitor 68b to turn on switching transistor 78b to thereby connect node VS1 to VG2. Clock signal Ph1a is then employed to charge capacitor 76b to thereby pump node VG2. Pumping node VG2 turns on stage transistor 66b which charges node VS2 to a level corresponding to node VS1. Without VT canceler circuit 76b, node VS2 would be charged only to the level of VS1 minus VT (where VT is the threshold voltage drop of stage transistor 66b).

Although the implementation of VT canceler circuits 74a and 74b increases the efficiency of a charge pump having pump circuit 50 by increasing $V_{out}$ by employing the next pump stage to cancel the VT of the previous pump stage, there is still a need in the art of integrated circuit design, and in the particular, design of memory integrated circuits, such as non-volatile memory systems using programming voltages for programming and erasing memory cells, for charge pump circuits which are more efficient by increasing $V_{out}$ without increasing the input supply power. For reasons stated above and for other reasons presented in greater detail in the Description of the Preferred Embodiments section of the present specification, any significant increase in efficiency of charge pumps is strongly desired when the charge pumps are in integrated circuits operating with low supply voltages and small load currents and with reduced power consumption as a major design concern, such as charge pumps in non-volatile memory integrated circuits.

SUMMARY OF THE INVENTION

The present invention provides a method and integrated circuit including a charge pump for transforming an input supply voltage to a pump output voltage. The charge pump includes N pump stages. Each pump stage receives a stage input voltage and provides a corresponding stage output voltage. A first pump stage receives the input supply voltage as its stage input voltage. An output transistor is configured as an output diode coupled between the Nth stage output voltage and the pump output voltage. The output transistor has a threshold voltage which produces a voltage drop across the output diode. An output threshold voltage canceler compensates for the threshold voltage of the output transistor.

In one embodiment of the present invention, the output threshold voltage canceler includes a P-channel switching transistor having its drain coupled to the gate of the output transistor and its source coupled to the drain of the output transistor, such that the output transistor functions as the output diode when the switching transistor is switched on. In this embodiment, the output threshold canceler also includes a level switcher which receives a digital signal and a voltage at the gate of the output transistor and provides a level shifted signal to the gate of the switching transistor representing the digital signal increased to a voltage level substantially equal to the voltage at the gate of the output transistor. In this embodiment, the output threshold voltage canceler also includes a canceler capacitor coupled between the gate of the output transistor and a cancel clock signal. The canceler capacitor is charged and discharged during a clock cycle of the cancel clock signal. The level shifter responds to the digital signal being at a first state to provide the level shifted voltage at a voltage level which turns on the switching transistor to equalize the voltages at the drain and gate of the output transistor. The level shifter responds to the digital signal being at a second state to provide the level shifted voltage at a voltage level which turns off the switching transistor. The canceler capacitor pumps the voltage at the gate of the output transistor when the switching transistor is shut off.

In one embodiment of the present invention, the charge pump responds to clock control signals to perform operations. First, the output threshold voltage canceler equalizes the voltage at the gate of the output transistor and the Nth stage output voltage at the drain of the output transistor. Then, the Nth pump stage charges the Nth stage output voltage. Then, the output threshold canceler disconnects the gate of the output transistor from the drain of the output transistor. Then, the output threshold canceler charges the voltage at the gate of the output transistor to a level at least the threshold voltage of the output transistor higher than the Nth stage output voltage to permit the output transistor to charge the pump output voltage to substantially the same voltage level as the Nth stage output voltage.

In one embodiment of the present invention, each of the N pump stages includes a pump capacitor which is charged and discharged during a clock cycle of the charge pump. A stage transistor is configured as a stage diode coupled between the pump capacitor and the stage input voltage to prevent discharging of the pump capacitor. Each stage transistor has a threshold voltage which produces a voltage drop across its the stage diode. In this embodiment, the each pump stage includes a stage threshold voltage canceler which compensates for the threshold voltage of its corresponding stage transistor. The stage threshold voltage canceler includes a switching transistor having its source coupled to the stage input voltage and its drain coupled to the gate of the stage transistor and its gate coupled to the stage output voltage. A canceler capacitor is coupled between the gate of the stage transistor and a cancel clock signal. The canceler capacitor is charged and discharged during a clock cycle of the cancel clock signal.

The charge pump according to the present invention employing a threshold voltage canceler circuit in the output stage is able to substantially increase the voltage available as the pumped output voltage. Without an output stage threshold voltage canceler circuit, the threshold voltage drop of the output transistor would cause the pump output voltage to be equal to the Nth stage output voltage minus VT (where VT is the threshold voltage drop of the output transistor). With a output stage threshold voltage canceler circuit according to the present invention, the voltage available as the pump output voltage is increased to the Nth stage output voltage.

Thus, there is not a VT drop due to the output transistor with the charge pump according to the present invention. For a charge pump with multiple stages, this output transistor VT can be quite large due to the large back bias on the output transistor. This large VT coupled with a low supply voltage causes a charge pump without an output stage threshold canceler circuit to have a significantly lower efficiency than a charge pump with the output stage threshold voltage canceler circuit according to the present invention. Furthermore, the area of the integrated circuit required to implement the more efficient charge pump according to the present invention is significantly reduced compared to the area required to implement previous less efficient charge pumps.

The conventional stage VT canceler circuits described in the Background of the Invention Section of the Present Application increase the efficiency of a charge pump by increasing $V_{out}$ by employing the next pump stage to cancel the VT of the previous pump stage. Therefore, this conventional technique cannot be employed to cancel the VT of the output stage, because there is no pump stage that follows the output stage.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
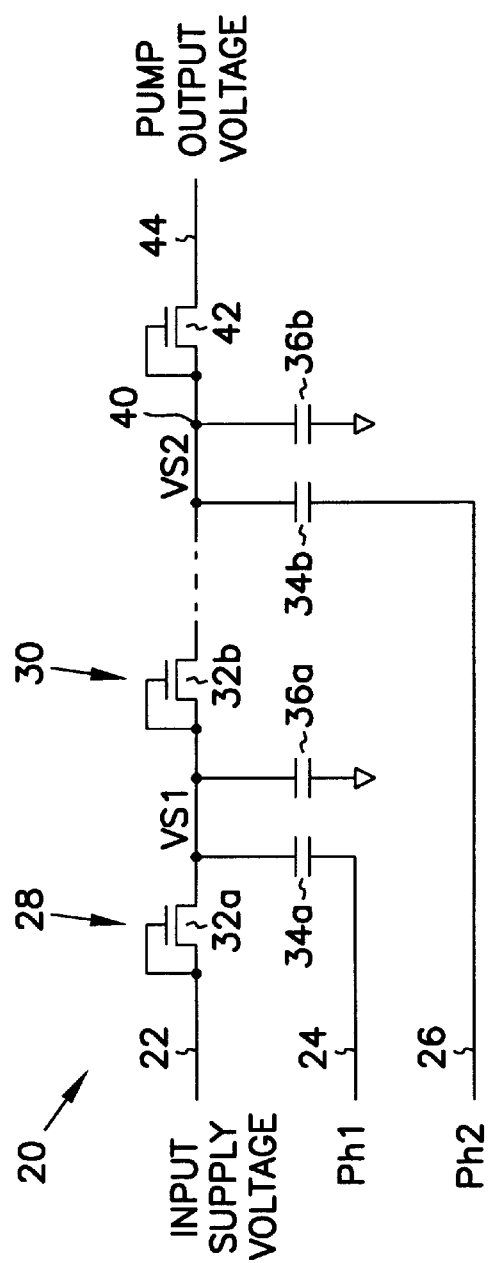
FIG. 1A is a schematic diagram of a prior art pump circuit.
Figure 1B:
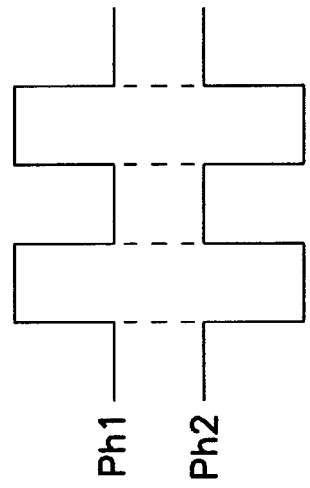
FIG. 1B is a timing diagram illustrating clock control signals used to control the operation of the pump circuit of FIG. 1A.
Figure 2A:
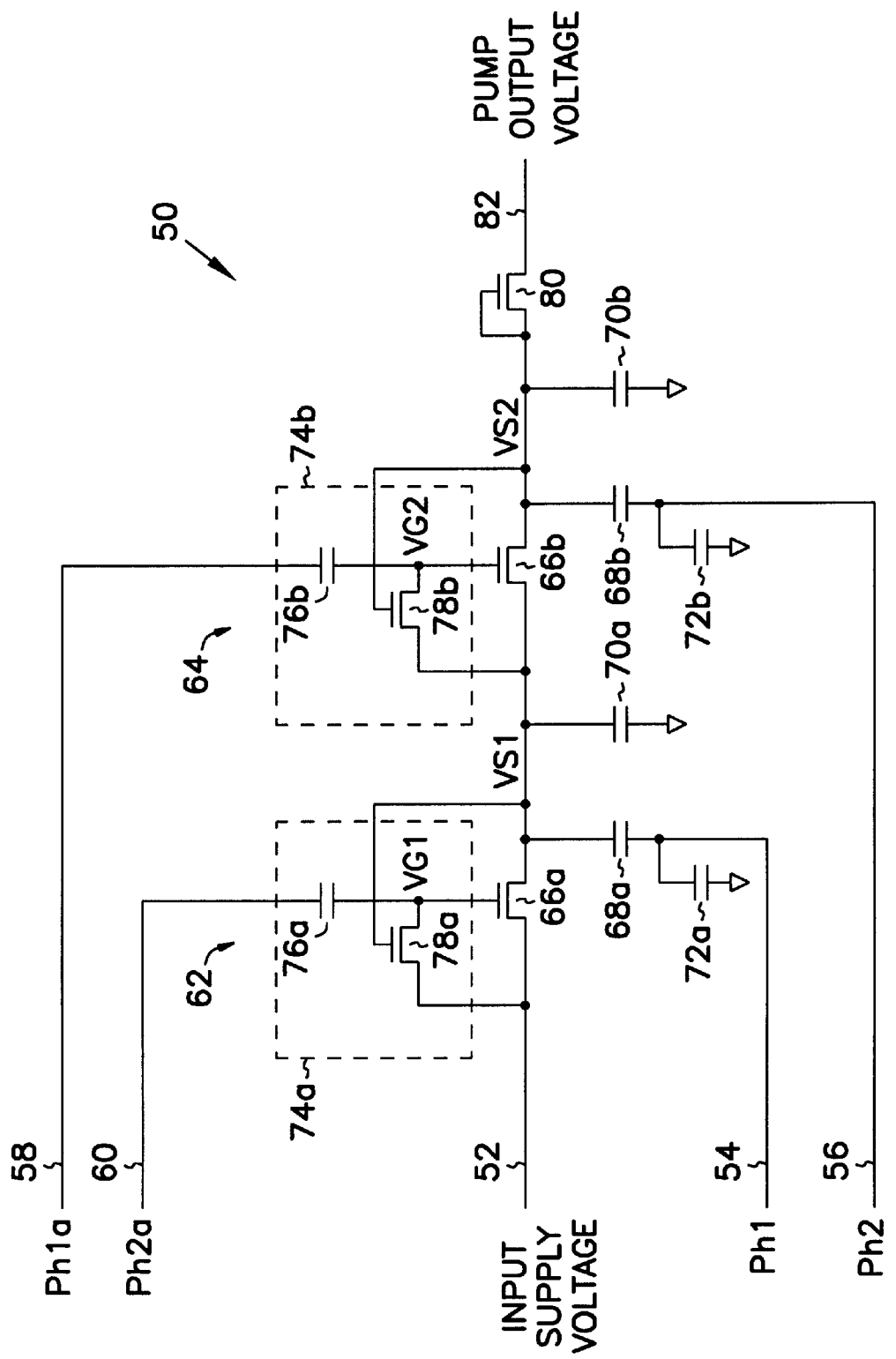
FIG. 2A is a schematic diagram of a prior art pump circuit having stage VT canceler circuits.
Figure 2B:
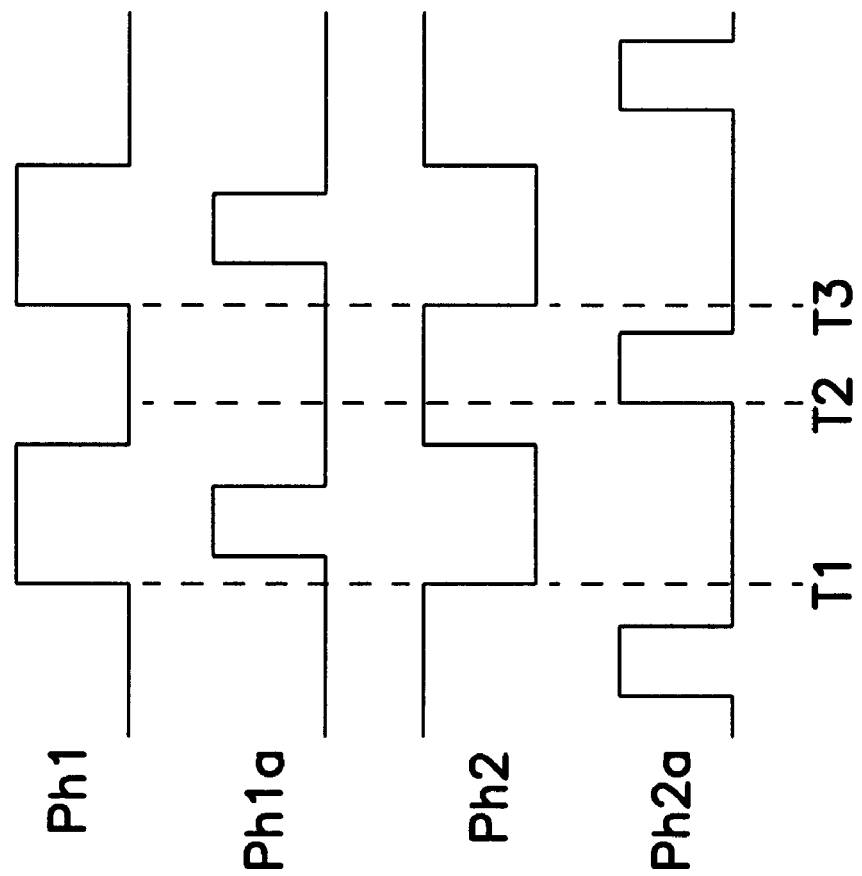
FIG. 2B is a timing diagram illustrating clock control signals used to control the operation of the pump circuit of FIG. 2A.
Figure 3:
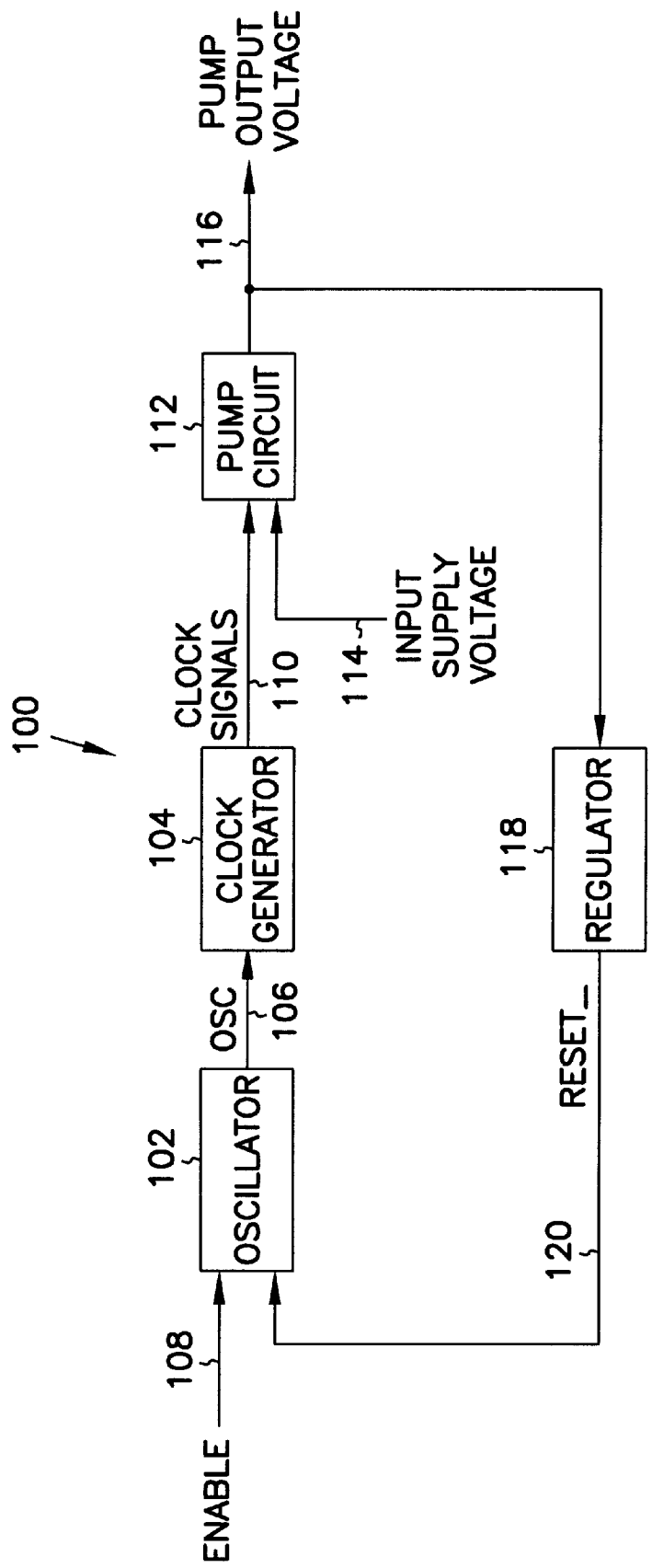
FIG. 3 is a block diagram of a charge pump according to the present invention.

A charge pump according to the present invention is illustrated generally at 100 in block diagram form in FIG. 3. Charge pump 100 includes an oscillator 102 which provides an oscillator signal to a clock generator 104 on a line 106. The operation of oscillator 100 is initiated by an enable signal received on a line 108. Clock generator 104 responds to the oscillator signal on line 106 to generate clock signals provided on lines 110 to a pump circuit 112. The clock signals on lines 110 control the charging of capacitors in pump circuit 112. Pump circuit 112 transforms an input supply voltage on a line 114 to a pump output voltage on a line 116. A regulator 118 samples the pump output voltage on line 116 and generates a reset_signal provided on a line 120 when pump circuit 112 provides a desired output voltage level. Regulator 118 controls the operation of oscillator 102 to cause the pump output voltage on line 116 to approach the desired output voltage level.

One form of the present invention includes an integrated circuit, such as a non-volatile memory integrated circuit, which employs a charge pump according to the present invention to transform a supply voltage to a higher voltage needed to operate a circuit element in the integrated circuit. For example, a non-volatile memory, such as a flash memory requires a programming voltage higher than the input supply voltage for programming and erasing memory cells in a non-volatile memory.

Figure 4:
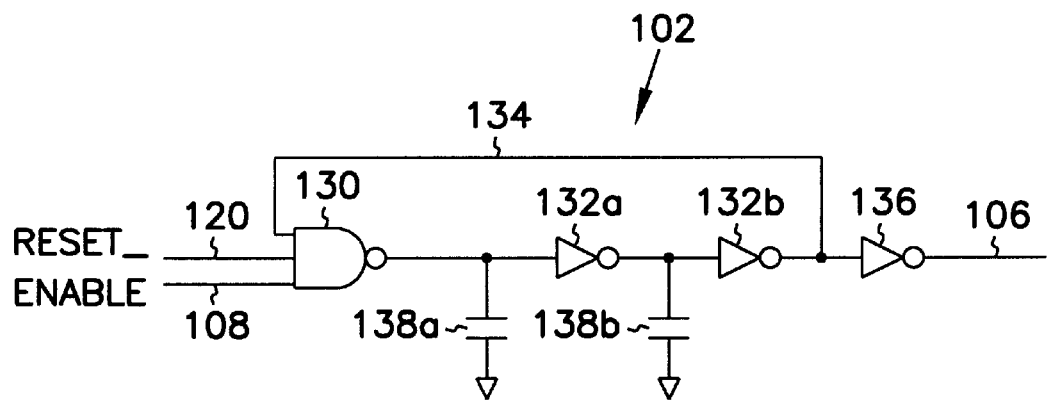
FIG. 4 is a schematic diagram of an oscillator employed in the charge pump of FIG. 3.

Oscillator 102 is typically a ring oscillator having a chain of delay elements with the output of the last delay element being fed back to the input of the first delay element to maintain oscillations. One embodiment of oscillator 102 is illustrated in schematic diagram form in FIG. 4. The embodiment of oscillator 102 illustrated in FIG. 4 includes a first stage delay element which is a NAND gate 130, and two additional stage elements which are inverters 132a and 132b. NAND gate 130 receives the reset_signal on line 120, the enable signal on line 108, and the output of the last stage delay element (inverter 132b) on a line 134. If either the enable signal on line 108 or the reset_signal on line 120 is low, oscillator 102 is turned off. The output of inverter 132b is also provided to an output inverter buffer 136, which provides the oscillator signal on line 106 to clock generator 104. Oscillator 102 also includes capacitors 138a and 138b to set up the delay stages.

Figure 5:
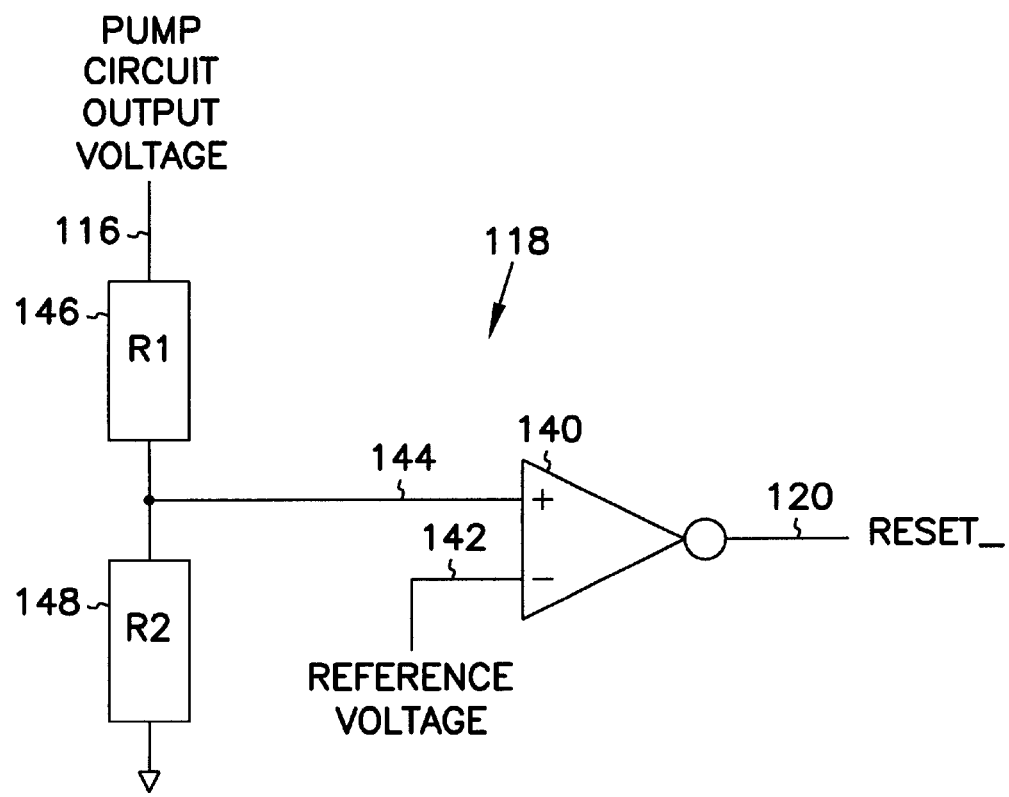
FIG. 5 is a schematic diagram of a regulator employed in the charge pump of FIG. 3.

One embodiment of regulator 118 is illustrated in schematic diagram form in FIG. 5. Regulator 118 includes a differential amplifier 140 receiving a fixed reference voltage at a first input line 142 and a divided pump circuit output voltage on a second input line 144. The pump circuit 112 pump output voltage on line 116 is divided by a resister divider containing resistors 146 and 148. Resistor 146 has one node coupled to the pump output voltage on line 116 and its other node coupled to input line 144 while resister 148 has one node coupled to ground and its other node coupled to input line 144. The resistance ratio of resisters 146 and 148 is selected to provide the proper trip point for differential amplifier 140. The output of differential amplifier 140 is provided on line 120 as the reset_signal which controls oscillator 102. In this way, regulator 118 samples the pump output voltage on line 116 and activates the reset_signal on line 120 when pump circuit 112 outputs the desired voltage level.

Figure 6A:
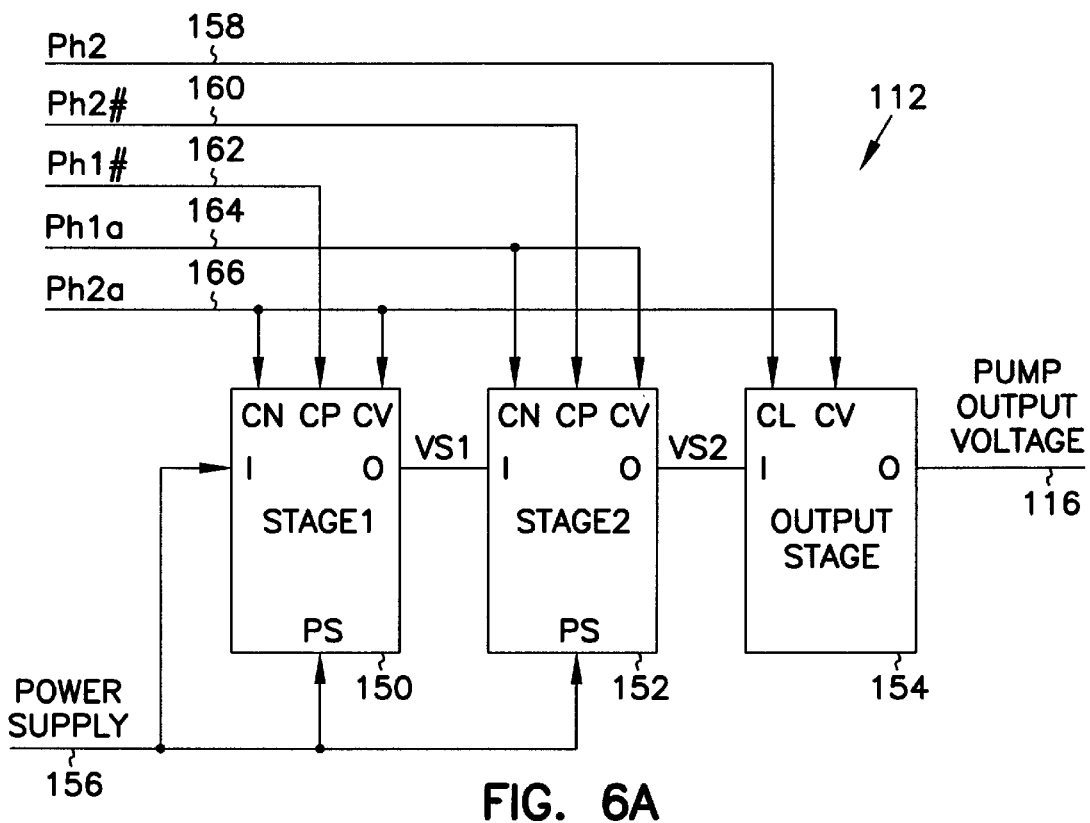
FIG. 6A is a block diagram of a pump circuit according to the present invention employed in the charge pump of FIG. 3.

One embodiment of pump circuit 112 according to the present invention is illustrated in block diagram form in FIG. 6A. The embodiment of pump circuit 112 illustrated in FIG. 6A includes a first pump stage 150 and a second pump stage 152. Although only two pump stages are illustrated in FIG. 6A, it is to be understood that many other such stages are typically employed to increase the input supply voltage to a sufficient pumped output voltage level for use in the integrated circuit containing charge pump 100, such as a non-volatile memory integrated circuit which uses a pumped programming voltage. The output of the first pump stage 150 is provided on a first stage output node VS1 and the output of second pump stage 152 is provided on a second stage output node VS2. The pumped voltage on node VS2 is provided to an output stage 154. Output stage 154 provides the pump output voltage on line 116. The power supply voltage is provided as the input supply voltage to first pump stage 150 and is also provided to the PS input of pump stages 150 and 152.

Figure 6B:
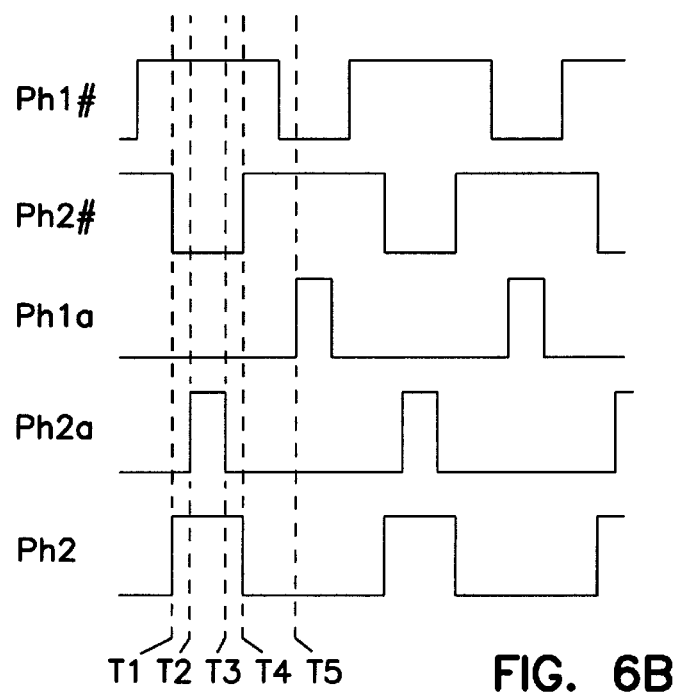
FIG. 6B is a timing diagram illustrating clock control signals used to control the operation of the pump circuit of FIG. 6A.

FIG. 6B illustrates in timing diagram form example clock signals generated by clock generator 104 and provided on line 110 to pump circuit 112. A clock signal Ph2 is provided on a clock line 158 to a CL input of output stage 154. A clock signal Ph2# is provided on a clock line 162 a CP input of second pump stage 152. A clock signal Ph1# is provided on a clock line 162 to a CP input of first pump stage 150. A clock signal Ph1a is provided on a clock line 162 to a CN input and a CV input of second pump stage 152. A clock signal Ph2a is provided on a clock line 166 to a CN input and a CV input of first pump state 150 and a CV input to output stage 154.

Figure 7A:
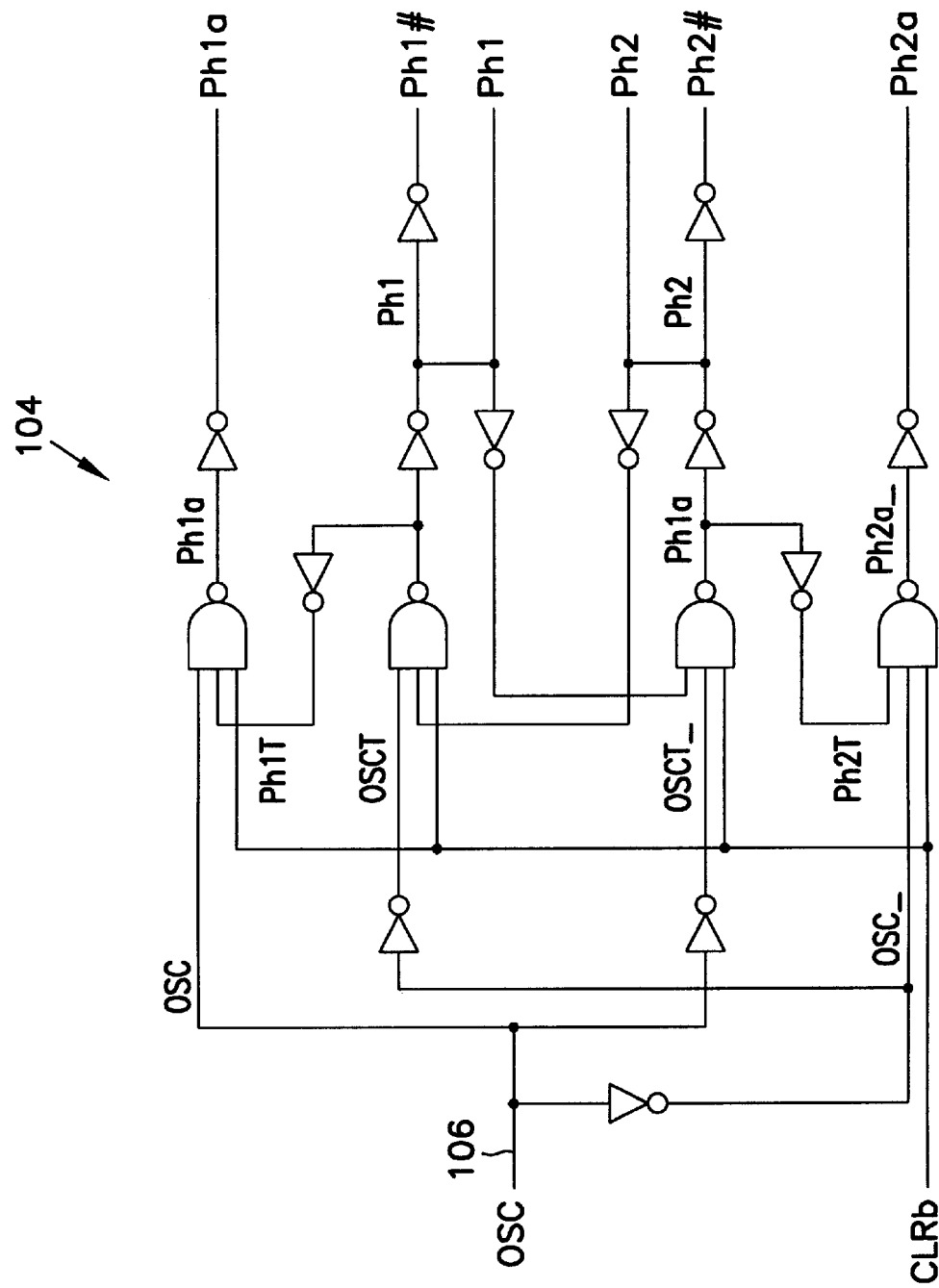
FIG. 7A is a schematic diagram of a clock generator employed in the charge pump of FIG. 3.
Figure 7B:
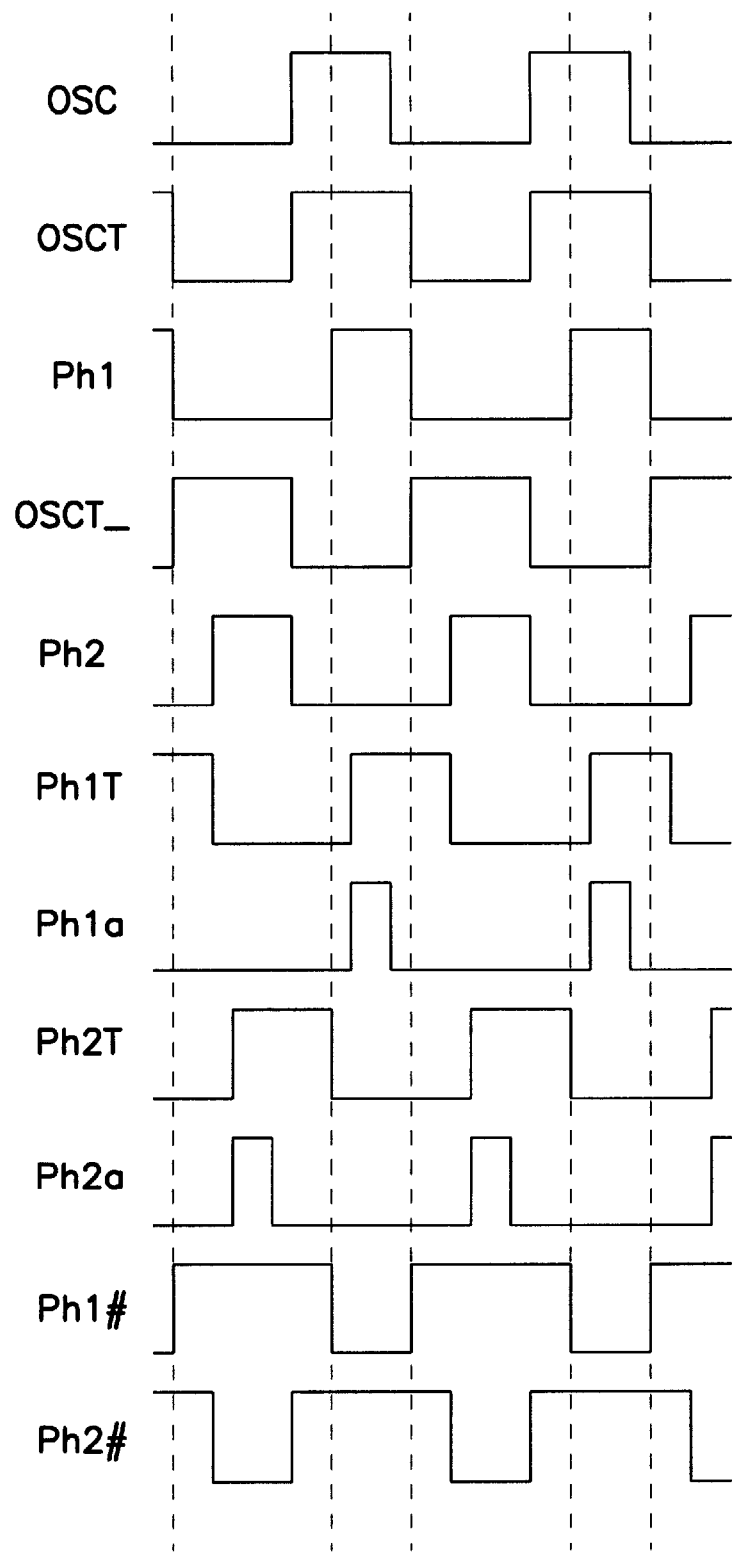
FIG. 7B is a timing diagram illustrating clock control signals produced by the clock generator of FIG. 7A.

The clock signals Ph1#, Ph2#, Ph1a, Ph2a, and Ph2, illustrated in timing diagram form in FIG. 6B, represent only one example of numerous possible clock signals which could be used to control pump stages 150 and 152 and output stage 154 according to the present invention. One embodiment of a clock generator 104 capable of generating the clock signals illustrated in FIG. 6B is illustrated in schematic diagram form in FIG. 7A. The clock generator 104 of FIG. 7A receives the oscillator (OSC) signal on line 106 from oscillator 102. Clock generator 104 of FIG. 7A also receives a reset or clear (CLRb) signal and responds to the OSC and CLRb input signals to produce internal signals OSCT, OSCT_,Ph1T, and Ph2T. The OSC and CLRb input signals are combined with one or more of the internal signals OSCT, OSCT_,Ph1T, and Ph2T to produce output clock signals Ph1, Ph2, Ph1a, Ph2a and Ph1# and Ph2#. Except for the CLRb input signal, all the above input signals, internal signals, and output clock signals are illustrated in timing diagram form in FIG. 7B. Clock generator 104 of FIG. 7A employs known clock generator techniques by using a combination of three input NAND gates and inverter circuits configured as shown in FIG. 7A to produce the Ph1, Ph2, Ph1a, Ph2a, Ph1, and Ph2# output clock signals.

Figure 8:
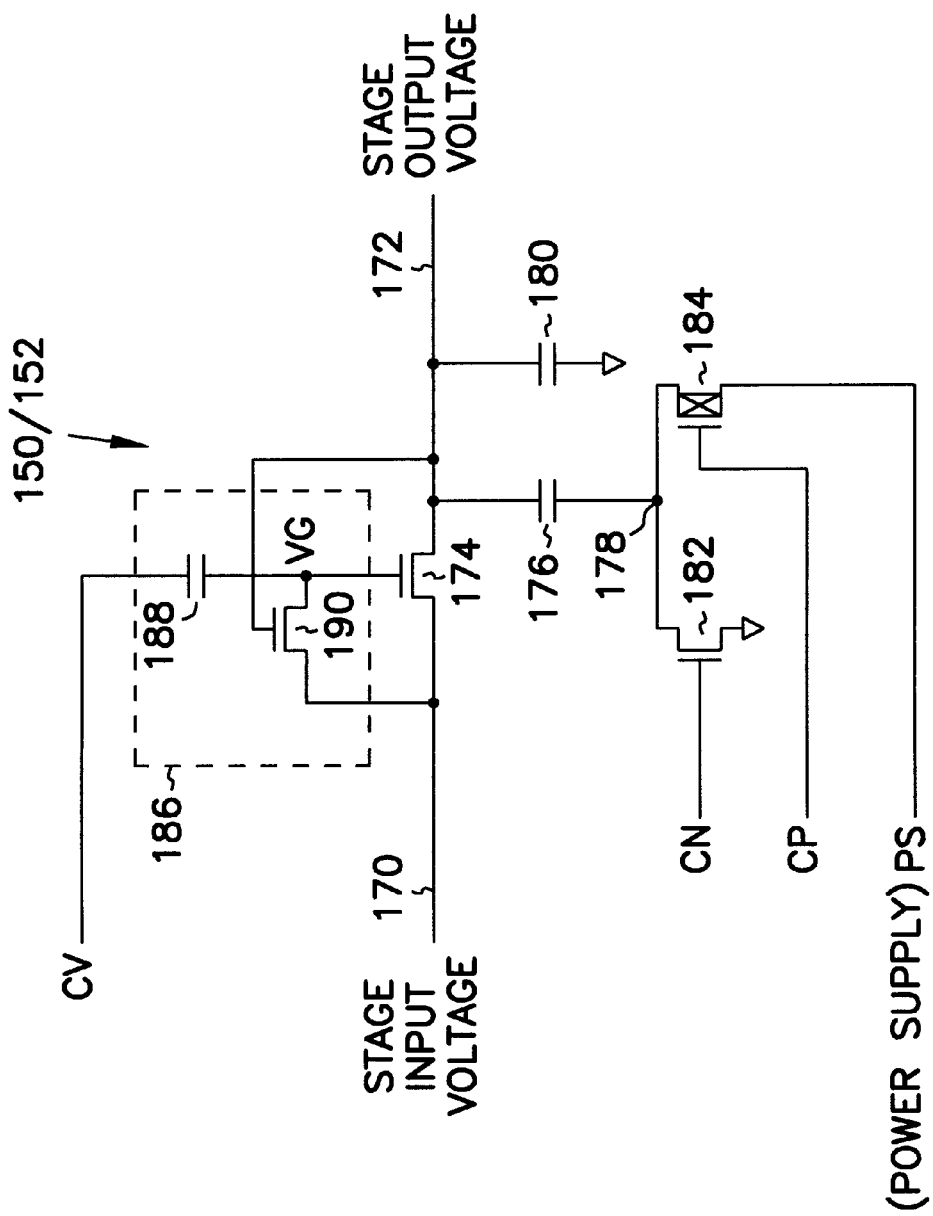
FIG. 8 is a schematic diagram of a single pump stage employed in the pump circuit of FIG. 6A.

One embodiment of a single pump stage, such as pump stage 150 or 152, is illustrated in schematic diagram form in FIG. 8. The single pump stage illustrated in FIG. 8 may also be used to add additional pump stages to pump circuit 112 illustrated in FIG. 6A to further increase the pump output voltage on line 116. Single pump stage 150/152 receives a stage input voltage on a line 170 and provides a stage output voltage on a line 172. The stage input voltage is provided from the input supply voltage when the single pump stage is implemented as the first pump stage. In the subsequent N–1 pump stages, the stage input voltage on line 170 is the stage output voltage from the previous pump stage. The stage output voltage on line 172 is provided as the stage input voltage to the next pump stage for the first N−1 pump stages and as the Nth stage output voltage to output stage 154 for the Nth pump stage.

The control clock signals are received on the CV, CN, CP inputs of single pump stage 150/152. As illustrated in FIG. 6A, clock signal Ph2a is coupled to the CN and CV clock inputs of first pump stage 150. The Ph1a clock signal is coupled to the CN and CV clock inputs of second pump stage 152. The Ph1# is coupled to the CP clock input of first pump stage 150. The Ph2# is coupled to the CP clock input of second pump stage 152.

Single pump stage 150/152 comprises a stage transistor 174 which is configured to act as a diode coupled between the stage input voltage on line 170 and the stage output voltage on line 172. A pump capacitor 176 is coupled between the stage output voltage on line 172 and a pump control node 178. A capacitance indicated at 180 represents a stray capacitance ($C_s$) on the charged node side of single pump stage 150/52. If pump capacitor 176 is formed from a properly configured transistor, or is fabricated in a similar manner, an additional stray capacitance associated with the configured transistor, associated routing, and/or adjacent devices is also produced on the driver side of pump capacitor 176.

An N-channel transistor 182 receives the CN clock input on its gate, and has its source coupled the ground, and its drain coupled to pump control node 178. Thus, when the CN clock input is active high, N-channel transistor 182 couples pump control node 178 to ground. A P-channel transistor 184 has its gate coupled to the CP clock input, its source coupled to the power supply input PS, and its drain coupled to pump control node 178. Thus, when the clock input node CP is active low, P-channel transistor 184 couples the pump control node 178 to the power supply provided on the PS input. Therefore, transistors 182 and 184 together function as drivers for the clock signals provided on the CN and CP clock inputs to charge pump capacitor 176.

Single pump stage 150/152 also includes a threshold voltage (VT) canceler circuit 186. VT canceler circuit 186 includes a canceler capacitor 188 coupled between the CV clock input and a node VG at the gate of stage transistor 174. VT canceler circuit 186 also includes a switching N-channel transistor 190 having its source coupled to the input supply voltage on line 170, its drain coupled to node VG, and its gate coupled to the stage output voltage on line 172. Thus, when switching transistor 190 is switched on, stage transistor 174 becomes configured to act as a diode connected between the input supply voltage on line 170 and the stage output voltage on line 172.

VT canceler circuit 186 operates in a similar manner to the VT canceler circuits 74A and 74B described in the Background of the Invention section of the present specification. Node VG is pre-charged to a level equal to that of the stage input voltage on line 170. Pump capacitor 176 is charged through the control of clock signals CN and CP and transistors 182 and 184 to turn on switching transistor 190 to thereby pump node VG. Pumping node VG turns on stage transistor 174 which charges the stage output voltage on line 172 to a level corresponding to the stage input voltage on line 170. Without VT canceler circuit 186, the stage output voltage on line 172 would be charged only to the level of the stage input voltage minus VT (where VT is the threshold voltage drop of stage transistor 174).

Figure 9:
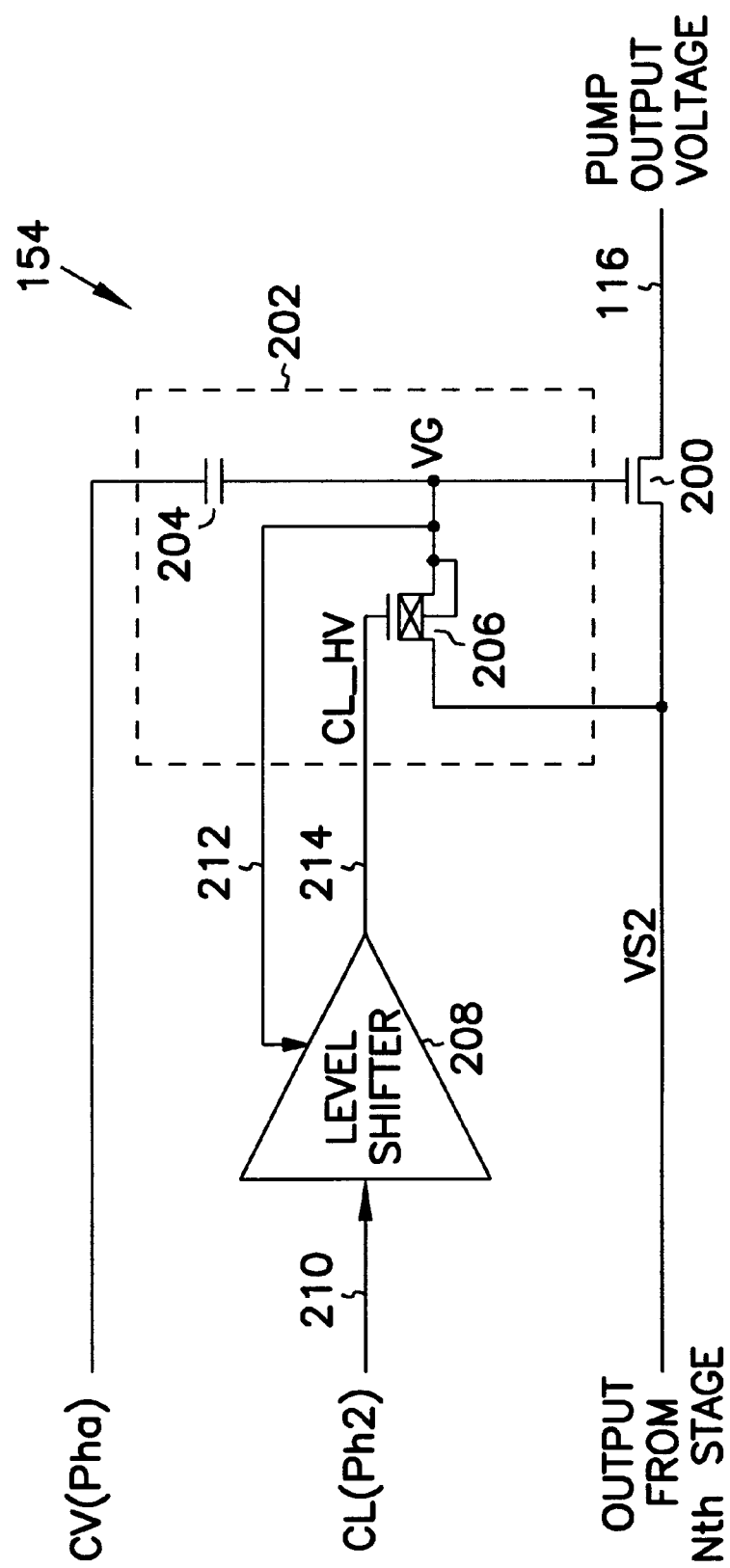
FIG. 9 is a schematic diagram of an output stage having an output stage VT canceler circuit according to the present invention employed in the pump circuit of FIG. 6A.

One embodiment of an output stage 154 according to the present invention for use in pump circuit 112 is illustrated in schematic diagram form in FIG. 9. Output stage 154 receives the Nth stage output voltage on a node VS2. Output stage 154 provides the pump output voltage on line 116. An output transistor 200 is configured as a diode connected between the pump output voltage on line 116 and the Nth stage output voltage at node VS2. Output transistor 200 shields the final pump voltage at node VS2 from the load or output capacitance connected to output line 116.

Unlike previous charge pump designs, output stage 154 includes an output threshold voltage (VT) canceler circuit 202 which compensates for the VT of output transistor 200. Output stage 154 receives the Ph2a clock signal on clock input CV and the Ph2 clock signal on clock input CL to control the operation of VT canceler circuit 202. VT canceler circuit 202 includes a canceler capacitor 204 coupled between the CV clock input and a node VG at the gate of output transistor 200. VT canceler circuit 202 also includes a switching P-channel transistor 206 having its source coupled to node VS2 and its drain coupled to node VG. Thus, when a low voltage is provided on the gate of switching transistor 206, switching transistor 206 turns on to couple the gate of output transistor 200 (at node VG) to the drain of output transistor 200 (at node VS2) to make output transistor 200 act as a diode connected between node VS2 and the pump output voltage on line 116. The N-well of P-channel transistor 206 is preferably coupled to its drain at node VG.

VT canceler circuit 202 also includes a level shifter 208 which receives the CL clock input on an input line 210 and the voltage at node VG on an input line 212 and provides a level shifted signal CL_HV on an output line 214, which is coupled to the gate of switching transistor 206. Level shifter 208 shifts the voltage level of the digital clock input signal CL on line 210 to a voltage level substantially equal to the voltage level on line 210 at node VG. Thus, the CL_HV signal provided by level shifter 208 on line 214 represents the digital clock signal CL increased to the voltage level at node VG.

The operation of the VT canceler circuit 202 of output stage 154 is best understood by referring to the block diagram of pump circuit 112 in FIG. 6A, the timing diagram of clock control signals in FIGS. 6B, and the schematic diagram of output stage 154 illustrated in FIG. 9. Prior to time T1, clock signal Ph2 provided on the CL input is low. With the CL input on line 210 to level shifter 208 being low, level shifter 208 brings the CL_HV signal on line 214 to ground. The low level on line 214 turns on P-channel switching transistor 206 to couple node VG to input node VS2 to equalize the voltage at the gate of output transistor 200 to the Nth stage output voltage at the drain of output transistor 200.

At time T1, the Ph2# clock signal provided to the CP clock input of second stage 152 goes low to cause second pump stage 152 to pump the voltage at node VS2 to a higher voltage. Also at time T1, the Ph2 clock signal goes high which triggers level shifter 208 to bring the CL_HV signal on line 214 to a high potential substantially equal to the voltage at node VG to thereby shut off P-channel switching transistor 206. Level shifter 208 has an inherent delay after the Ph2 digital clock input signal goes high before providing a high potential to the gate of switching transistor 206 to cause transistor 206 to shut off. Thus, switching transistor 206 shuts off an inherent delay time after node VS2 is pumped. In this way, node VG is already equalized to the pumped voltage on node VS2 prior to switching transistor 206 being shut off. If the inherent delay in level shifter 208 is not sufficient to permit node VG to be equalized to the pumped voltage on node VS2, the rising edge of the Ph2 clock signal can be delayed with reference to the falling edge of the Ph2# clock signal to permit node VG to be equalized to the pumped voltage on node VS2 prior to shutting off switching transistor 206.

At time T2, the Ph2a clock signal provided on the CV clock input to output stage 154 is brought high which causes canceler capacitor 204 to pump node VG to a potential that is at least a VT of output transistor 200 higher than node VS2. With the voltage at node VG at least a VT higher than node VS2, output transistor 200 is permitted to charge the pump output voltage on line 116 to the same potential as node VS2. Without VT canceler circuit 202, the threshold voltage drop of output transistor 200 would cause the pump output voltage on line 116 to be equal to the Nth stage output voltage on node VS2 minus VT (where VT is the threshold voltage drop of output transistor 200). With VT canceler circuit 202, the voltage available as the pumped output voltage is increased to the Nth stage output voltage. Thus, there is not a VT drop due to output transistor 200 for the output stage 154 of pump circuit 112. For a charge pump with multiple stages, this output transistor VT can be quite large due to the large back bias on output transistor 200. This large VT coupled with a low supply voltage can significantly lower the efficiency of a charge pump without an output stage VT canceler circuit, such as VT canceler circuit 202.

At time T3, the Ph2a clock signal goes low which causes node VG to no longer be pumped. With the voltage at node VG being brought down from the pumped voltage, output transistor 200 is shut off. At time T4, the Ph2 clock signal is brought low which causes level shifter 208 to bring the CL_HV signal on line 214 to a ground level. With the CL_HV signal at a ground level, switching P-channel transistor 206 is turned on to once again equalize nodes VG and VS2. At time T5, the Ph1 clock signal provided to the CN and CV clock control inputs of the second pump stage 152 is brought high to cause second pump stage 152 to bring the voltage at node VS2 down from its pumped potential to its regular level.

Figure 10A:
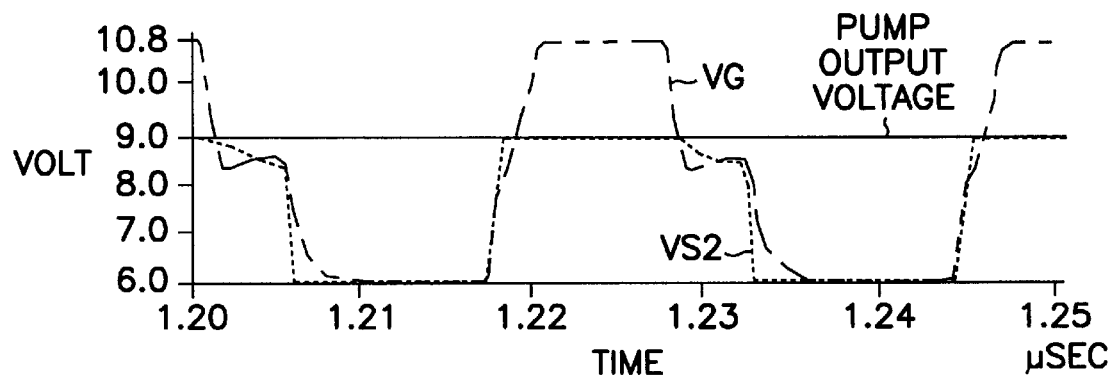
FIGS. 10A–C are timing diagrams representing a SPICE simulation of the charge pump of FIG. 3.
Figure 10B:
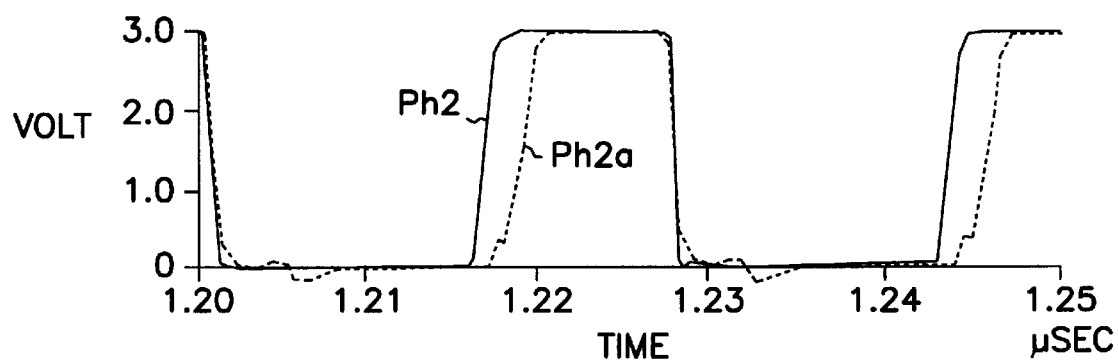
Figure 10C:
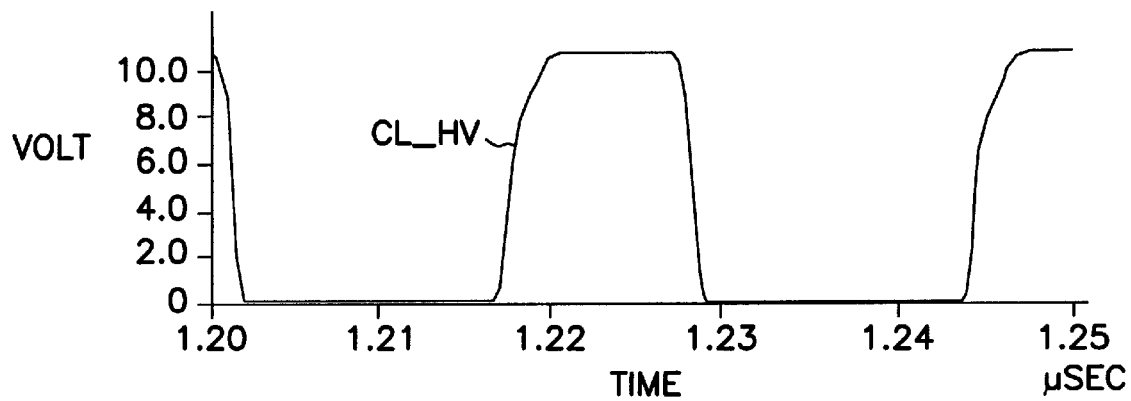

The above described operation of VT canceler circuit 202 is illustrated in FIGS. 10A–C with timing diagrams representing a SPICE simulation of the charge pump 100 according to the present invention. As illustrated in FIGS. 10A–C, when the Ph2 clock signal is low, level shifter 208 brings the CL_HV signal to ground which equalizes the voltages at the VS2 and VG nodes. When the Ph2 signal goes high which corresponds to the Ph2# signal going low, the VS2 node voltage is pumped to a higher voltage and level shifter 208 takes the CL_HV signal to a higher potential to shut off switching transistor 206. As is illustrated in the SPICE simulation timing diagrams of FIGS. 10A–C, the inherent delay of level shifter 208 causes switching transistor 206 to shut off after node VS2 is pumped to approximately 9 volts which allows node VG to be equalized to the pumped 9 volts of node VS2.

After the Ph2a signal rises, node VG is pumped to approximately 10.8 volts which is at least a VT higher than the 9 volts on node VS2. Node VG being at 10.8 volts permits output transistor 200 to charge the pump output voltage on line 116 to the same potential as node VS2 (i.e. approximately 9 volts).

When the Ph2a clock signal goes low, node VG is no longer pumped and is brought down to a level which shuts off output transistor 200. When the Ph2 clock signal goes low switching transistor 206 is turned on to once again equalize nodes VG and VS2. When the Ph1 a clock signal goes high (not shown in FIGS. 10A–C) node VS2 is brought down from its approximately 9 volt pumped potential to its approximately 6 volt regular potential.

Figure 11:
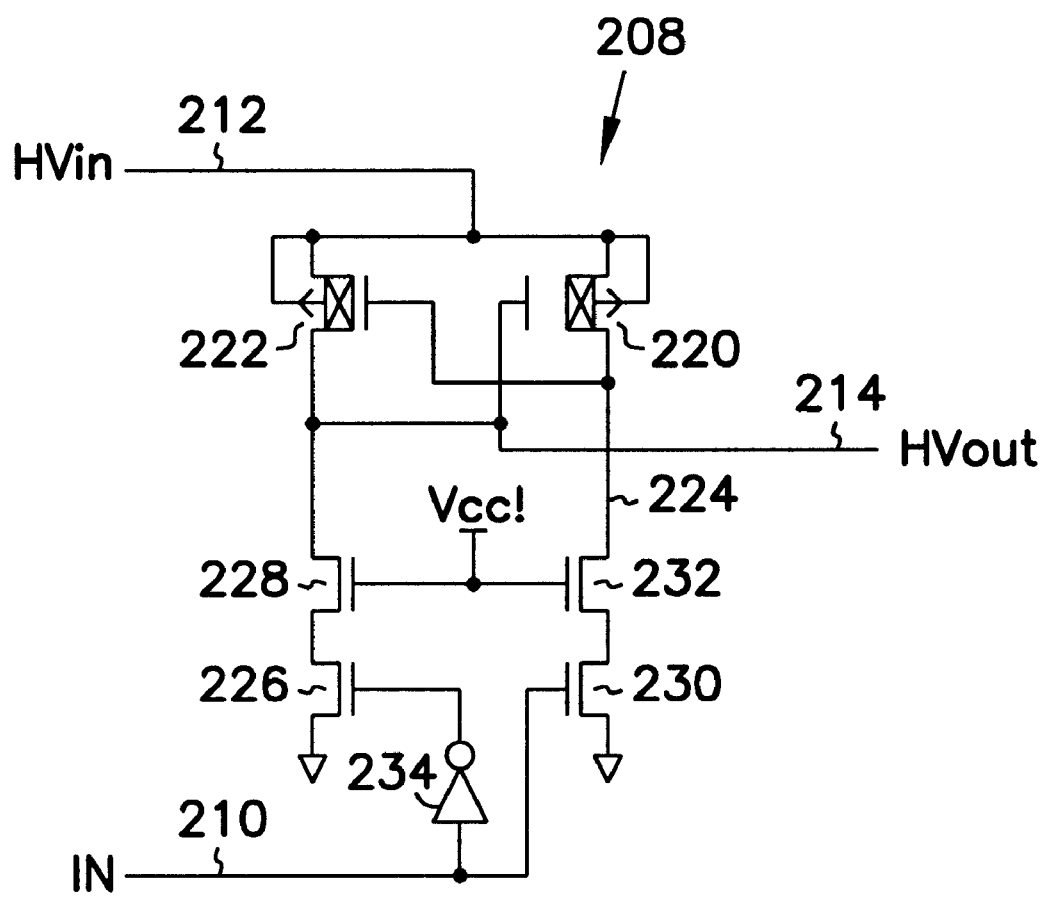
FIG. 11 is a schematic diagram of a level shifter employed in the output stage of FIG. 9.

One embodiment of level shifter 208 is illustrated in schematic diagram form in FIG. 11. Level shifter 208 includes two P-channel transistors 220 and 222 which receive a high voltage in (HVin) signal on line 212 at there sources. The N-wells of P-channel transistors 220 and 222 are coupled to their sources. The drain of P-channel transistor 222 and the gate of P-channel transistor 220 are coupled to a high voltage out (HVout) signal on line 214. The gate of P-channel transistor 222 and the drain of P-channel transistor 220 are coupled to a node 224.

A pair of N-channel transistors 226 and 228 are coupled serially between ground and the HVout signal on line 214. A pair of N-channel transistors 230 and 232 are coupled serially between ground and node 224. The digital clock control input (IN) signal is provided on line 210 to the gate of N-channel transistor 230. An inverter 234 also receives the IN signal on line 210 and provides an inverted IN signal to the gate of N-channel transistor 226. The sources of N-channel transistors 226 and 230 are coupled to ground and their drains are coupled to the sources of N-channel transistors 228 and 232 respectively. The drain of N-channel transistor 228 is coupled to line 214 and the drain of N-channel transistor 232 is coupled to node 224. The gates of N-channel transistors 228 and 232 are coupled to a VCC voltage level to ensure N-channel transistors 228 and 232 are always on.

N-channel transistors 228 and 232 act as guard devices for preventing the problem of snap back in N-channel transistors 226 and 230 respectively. Snap back is a potentially destructive phenomenon in MOSFET devices which occurs when the device is switched from a non-conducting OFF state to a conducting ON state while excessively high drain-to-source voltages are applied. N-channel transistors 228 and 232 guard against snap back by preventing the drain-to-source voltages on transistors 226 and 230 from becoming excessively high while being switched on.

In operation, when the IN signal on line 210 is low, N-channel transistor 230 is off, and N-channel transistor 226 is on. Since N-channel transistor 228 is also on, the HVout signal on line 214 is brought to a ground level. With the HVout signal low, P-Channel transistor 220 is turned on which charges node 224 to the voltage level of the HVin signal on line 212. With the voltage on node 224 high., P-channel transistor 222 is turned off.

When the IN signal on line 210 is brought high, N-channel transistor 230 is turned on and N-channel 226 is turned off. Since N-channel transistor 232 is also on, the voltage at node 224 is brought to a ground level. With the voltage at node 224 low, P-channel transistor 222 is turned on which equalizes the HVout voltage on line 214 to the HVin voltage on line 212. With the HVout signal on line 214 high, P-channel transistor 220 is shut off. Thus, level shifter 208 receives the digital IN signal on line 210 and the HVin signal on line 212 to provide a level shifted HVout signal on line 214 representing the digital IN signal on line 212 increased to a voltage level equal to the voltage level of the HVin signal on line 212.

Conclusion

A charge pump according to the present invention, such as charge pump 100 employing a VT canceler circuit in the output stage of its pump circuit, such as VT canceler circuit 202, is able to substantially increase the voltage available as the pumped output voltage. Without an output stage VT canceler circuit, the threshold voltage drop of the output transistor of the pump circuit would cause the pump output voltage to be equal to the Nth stage output voltage minus VT (where VT is the threshold voltage drop of the output transistor). With a output stage VT canceler circuit, such as VT canceler circuit 202, the voltage available as the pump output voltage is increased to the Nth stage output voltage. Thus, there is not a VT drop due to the output transistor with the charge pump according to the present invention. For a charge pump with multiple stages, this output transistor VT can be quite large due to the large back bias on the output transistor. This large VT coupled with a low supply voltage causes a charge pump without an output stage VT canceler circuit to have a significantly lower efficiency than a charge pump with the output stage VT canceler circuit according to the present invention. Furthermore, the area of the integrated circuit required to implement the more efficient charge pump according to the present invention is significantly reduced compared to the area required to implement previous less efficient charge pumps.

The conventional stage VT canceler circuits described in the Background of the Invention Section of the Present Application increase the efficiency of a charge pump by increasing $V_{out}$ by employing the next pump stage to cancel the VT of the previous pump stage. Therefore, this conventional technique cannot be employed to cancel the VT of the output stage, because there is no pump stage that follows the output stage.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A charge pump for transforming an input supply voltage to a pump output voltage, comprising:

N pump stages including at least a first pump stage, wherein each pump stage receives a stage input voltage and provides a corresponding stage output voltage, wherein the first pump stage receives the input supply voltage as its stage input voltage;

an output transistor configured as an output diode coupled between the Nth stage output voltage and the pump output voltage, wherein the output transistor has a threshold voltage which produces a voltage drop across the output diode; and an output threshold voltage canceler which compensates for the threshold voltage of the output transistor, the output threshold voltage canceler comprising a switching transistor having its drain coupled to the gate of the output transistor and its source coupled to the drain of the output transistor, such that the output transistor functions as the output diode when the switching transistor is switched on, and a level shifter receiving a digital signal and a voltage at the gate of the output transistor and providing a level shifted signal to the gate of the switching transistor representing the digital signal increased to a voltage level substantially equal to the voltage at the gate of the output transistor.

2. The charge pump of claim 1 wherein the output threshold voltage canceler further includes:

a canceler capacitor coupled between the gate of the output transistor and a cancel clock signal, wherein the canceler capacitor is charged and discharged during a clock cycle of the cancel clock signal.

3. The charge pump of claim 1 wherein level shifter responds to the digital signal being at a first state to provide the level shifted voltage at a voltage level which turns on the switching transistor to equalize the voltages at the drain and gate of the output transistor.

4. The charge pump of claim 3 wherein level shifter responds to the digital signal being at a second state to provide the level shifted voltage at a voltage level which turns off the switching transistor.

5. The charge pump of claim 1 wherein the charge pump responds to clock control signals to perform the operations of the output threshold voltage canceler equalizing the voltage at the gate of the output transistor and the Nth stage output voltage at the drain of the output transistor, then the Nth pump stage charging the Nth stage output voltage, then the output threshold canceler disconnecting the gate of the output transistor from the drain of the output transistor, then the output threshold canceler charging the voltage at the gate of the output transistor to a level at least the threshold voltage of the output transistor higher than the Nth stage output voltage to permit the output transistor to charge the pump output voltage to substantially the same voltage level as the Nth stage output voltage.

6. The charge pump of claim 1 wherein the each of the N pump stages includes:

a pump capacitor which is charged and discharged during a clock cycle of the charge pump; and a stage transistor configured as a stage diode coupled between the pump capacitor and the stage input voltage to prevent discharging of the pump capacitor.

7. The charge pump of claim 6 wherein each stage transistor has a threshold voltage which produces a voltage drop across its the stage diode, and wherein the first pump stage includes a first stage threshold voltage canceler which compensates for the threshold voltage of the first stage transistor.

8. The charge pump of claim 7 wherein the first stage threshold voltage canceler includes:

a switching transistor having its source coupled to the input supply voltage and its drain coupled to the gate of the first stage transistor and its gate coupled to the first stage output voltage.

9. The charge pump of claim 8 wherein the first stage threshold voltage canceler further includes:

a canceler capacitor coupled between the gate of the stage transistor and a cancel clock signal, wherein the canceler capacitor is charged and discharged during a clock cycle of the cancel clock signal.

10. A method of transforming an input supply voltage to a pump output voltage in an integrated circuit, comprising:

pumping the input supply voltage with N pump stages to provide an Nth stage output voltage;

shielding the Nth stage output voltage from the pump output voltage with an output transistor configured as an output diode, wherein the output transistor has a threshold voltage which produces a voltage drop across the output diode; and compensating for the threshold voltage of the output transistor to permit the output transistor to charge the pump output voltage to substantially the same voltage level as the Nth stage output voltage, wherein compensating is accomplished using a level shifter and a switching transistor, wherein the switching transistor is turned on and off by the level shifter to connect the output transistor as a diode when the switching transistor is turned on.

11. The method of claim 10 wherein compensating further comprises:

equalizing the voltage at the gate of the output transistor and the Nth stage output voltage at the drain of the output transistor;

charging the Nth stage output voltage;

disconnecting the gate of the output transistor from the drain of the output transistor; and charging the voltage at the gate of the output transistor to a level at least the threshold voltage of the output transistor higher than the Nth stage output voltage to permit the output transistor to charge the pump output voltage to substantially the same voltage level as the Nth stage output voltage.

12. An integrated circuit comprising:

N pump stages including at least a first pump stage, wherein each pump stage receives a stage input voltage and provides a corresponding stage output voltage, wherein the first pump stage receives an input supply voltage as its stage input voltage;

an output transistor having its drain coupled to the Nth stage output voltage and its source coupled to a pump output voltage; and a P-channel transistor having its drain coupled to the gate of the output transistor and its source coupled to the drain of the output transistor and its gate coupled to a source of a level shifted voltage signal; and a level switcher receiving a digital signal and a voltage at the gate of the output transistor and providing a level shifted signal to the gate of the switching transistor representing the digital signal increased to a voltage level substantially equal to the voltage at the gate of the output transistor.

13. The integrated circuit of claim 12 further comprising:

a capacitor coupled between the gate of the output transistor and a clock control signal.

14. The integrated circuit of claim 12 wherein the level shifter responds to the digital signal being at a first state to provide the level shifted voltage at a voltage level which turns on the switching transistor to equalize the voltages at the drain and gate of the output transistor.

15. The integrated circuit of claim 14 wherein the level shifter responds to the digital signal being at a second state to provide the level shifted voltage at a voltage level which turns off the switching transistor.

* * * * *